United States Patent
Blier et al.

(10) Patent No.: US 6,527,466 B1
(45) Date of Patent: Mar. 4, 2003

(54) UNIVERSAL SWIVEL MOUNT

(75) Inventors: David Blier, Verdun (CA); Viorel Mirica, Brossard (CA); Laszlo Pallai, Ste-Anne-de-Bellevue (CA)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/092,190

(22) Filed: Mar. 6, 2002

(51) Int. Cl.⁷ ................................................ E04G 3/00
(52) U.S. Cl. ........................ 403/83; 403/97; 362/418
(58) Field of Search ........................... 403/83, 84, 97, 403/99, 100, 94; 362/418, 269

(56) References Cited

U.S. PATENT DOCUMENTS

| | | |
|---|---|---|
| 2,361,853 A | 10/1944 | Lundquist |
| 3,205,522 A | 9/1965 | Then |
| 3,533,648 A | 10/1970 | Thieberger |
| 3,778,610 A | 12/1973 | Wolf |
| 4,974,139 A | 11/1990 | Chin-Song |
| 5,132,492 A | 7/1992 | Wieder |
| 5,564,852 A | 10/1996 | Maxwell et al. |
| 5,605,394 A | 2/1997 | Chen |
| 6,079,682 A * | 6/2000 | Olkkola .................... 403/97 X |
| 6,161,948 A * | 12/2000 | Hagen ........................ 362/418 |
| 6,409,411 B1 * | 6/2002 | Crorey ........................ 403/97 |

* cited by examiner

Primary Examiner—Lynne H. Browne
Assistant Examiner—John R. Cottingham
(74) Attorney, Agent, or Firm—Michael L. Hoelter

(57) ABSTRACT

The present invention provides an easily assemble swivel mount for supporting a fixture from a support. This swivel mount is of a design such that no tool or special device is needed to either initially position the fixture at a desired location or to change or re-position the fixture should such be desired. A continuous wire passageway is provided through the swivel mount so that no obstacles need be avoided thereby eliminating the possibility that a wire may become kinked within the swivel mount. Such continuous passageway also makes for easy wire insertion through the swivel mount.

18 Claims, 5 Drawing Sheets

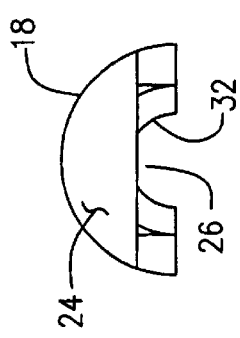
FIG. 7
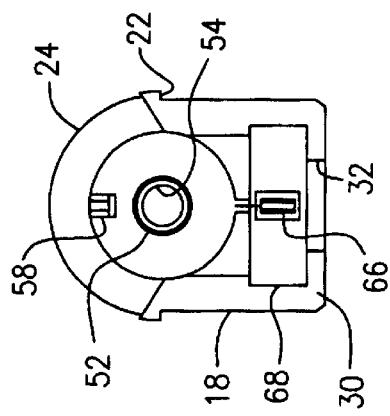
FIG. 8
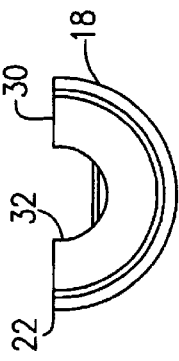
FIG. 9
FIG. 10
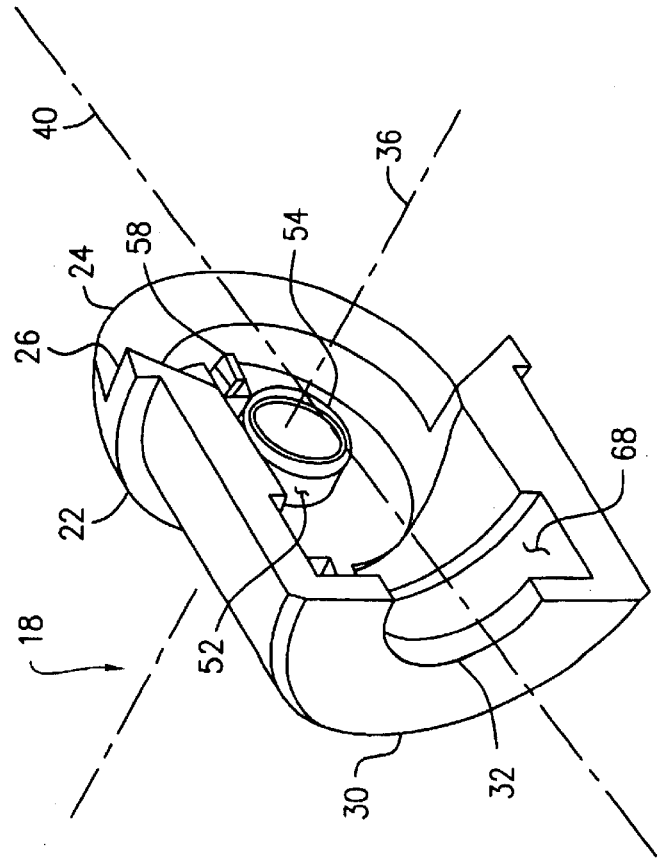
FIG. 6

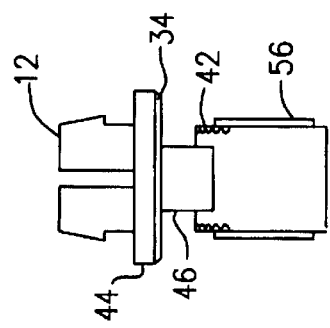
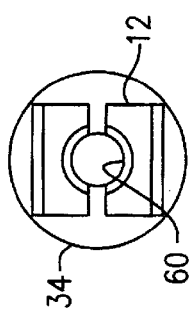
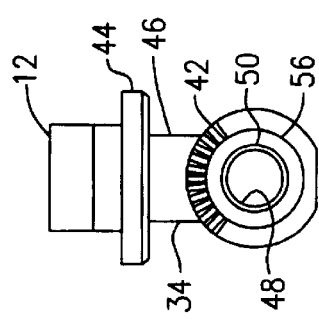
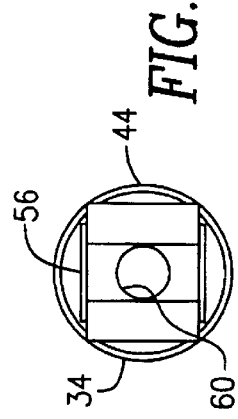
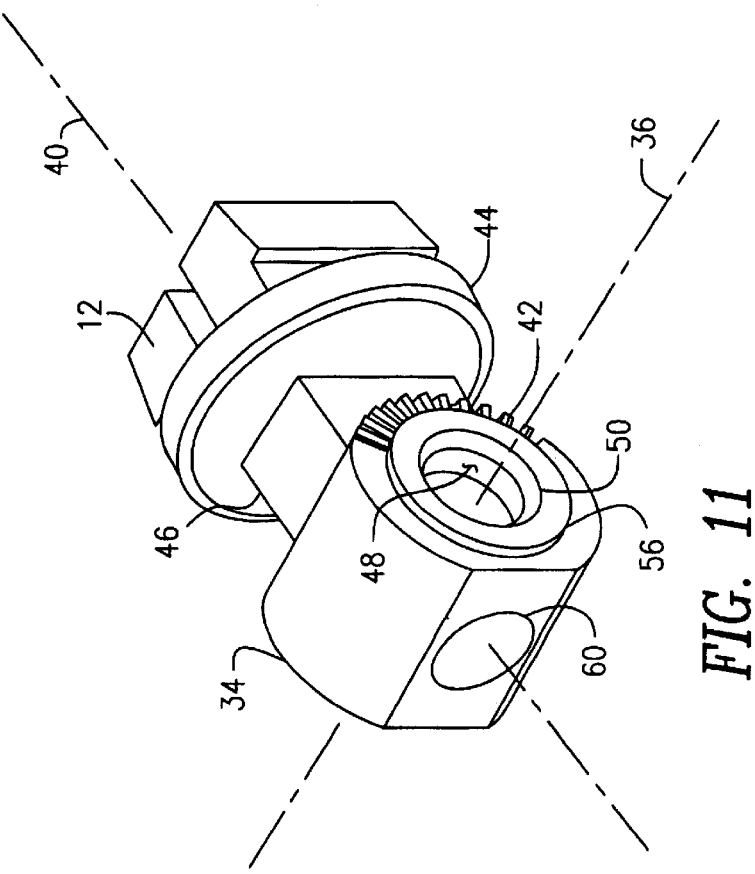

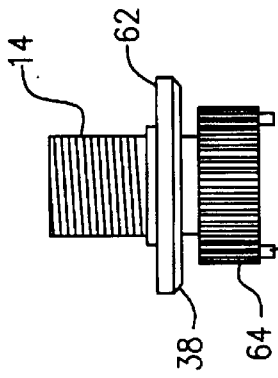
FIG. 17
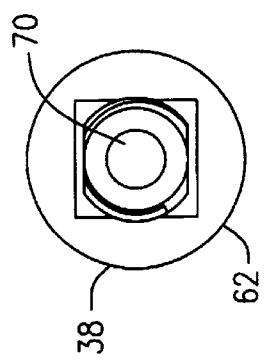
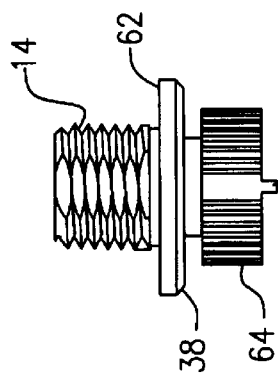
FIG. 18
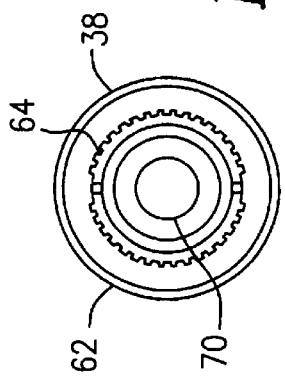
FIG. 19
FIG. 20
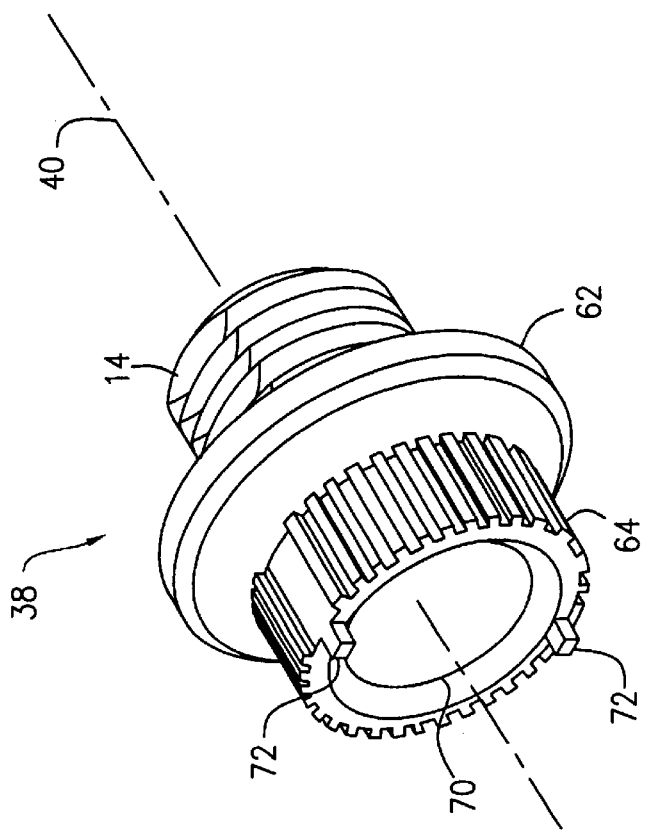
FIG. 16

UNIVERSAL SWIVEL MOUNT

FIELD OF THE INVENTION

The present invention relates generally to swivel mounts used for positioning purposes and more specifically to swivel mounts used to position and secure electrical devices, such as a lighting fixture, in a desired location.

BACKGROUND OF THE INVENTION

In the past it has been known to use swivel mounts to support electrical devices, such as lighting fixtures, at a desired position. These swivel mounts were often pole or panel mounted. Some operated by means of adjustable gearing that allowed the fixture to be moved and positioned as desired within a certain range. Others operated by means of friction between different surfaces. In any event, once the fixture was properly positioned, the swivel mount provided the support to maintain the fixture in place.

Over time, and due possibly to the heat generated by the electrical device, the swivel mount began to lose its ability to maintain the desired position against such external forces as gravity, weather or environmental changes. Thus the fixture began to droop thereby requiring re-adjustment.

One solution was to incorporate a bolt, nut, clamp or other tightening element to increase the frictional forces or the gearing inter-engagement of the swivel mount. However, by incorporating such an element, the ease at which the mount could be aligned or positioned decreased since now a tool was required to complete the task. Furthermore, the additional step and trouble of loosening and re-tightening this element became necessary.

These drawbacks became more apparent when two axis of movement were incorporated into swivel mounts. Thus, two such screws, nuts clamps or other tightening elements required manipulation before there could be movement of the swivel along the horizontal and the vertical axes. It often became the case that operators tightened one such element with respect to one axis before positioning the fixture with respect to the other axis. Thus, if further refinement of the fixture was required, the first element had to be re-adjusted which sometimes then necessitated the re-adjustment of the second element. Eventually, the operator was able to 'zero-in' on the desired position, but only after repeated loosening and tightening of the various element.

Ball and socket type of swivel mounts reduced the effort required of the operator since now only one tightening element need be addressed rather than the two generally required with gear-type swivel mounts. Nevertheless, the step of adjusting the fixture still necessitated the step of loosening and tightening the element before the fixture could be properly positioned.

Regardless of the type of swivel mount utilized, another issue that had to be addressed concerned the wires providing power to and control of the fixture so mounted. If the wires were to be run within or through the swivel mount, then this wiring often had to extend around internal obstacles thereby increasing the chance that it would be bent or kinked and thus create a hazard. Alternatively, if the wires were run external to the swivel mount to avoid such obstacles, then the exposed wiring became subject to all the elements and dangers associated with external wiring. Furthermore, the fact that wiring extended through or along the swivel mount at all often limited the range of movement permitted by the mount. Thus may be due to the fact that only so much 'slack' in the wiring was provided by the manufacturer or the wiring itself prevented the user from achieving the full range of movement made possible by the mount. Finally, the more complicated the wire run became to avoid the above shortcomings, the more costly it became to manufacture that particular device.

Also compounding the situation was the fact that the swivel mount itself was a small portion of the overall cost of the total fixture being adjusted. Thus, the manufacturing cost of this mount was kept as economical as possible with limited concern given to the frustration incurred by the operator in trying to align the fixture.

SUMMARY OF THE INVENTION

This invention pertains to a swivel mount designed to support a fixture (such as a lighting fixture) from a support. It is designed so that no tools or other devices are required to initially position the fixture in place or to re-position the fixture should a change in position be required. This swivel mount incorporates a first set of gear teeth for rotation about a first axis and a second set of gear teeth, for rotation about a second axis. The first and second axes being neither co-linear or parallel (but they are co-planar). Surrounding these sets of gear teeth is an outer body that is configured with first and second pawls for yieldable engagement with, respectively, these sets of gear teeth. A third member maintains engagement of these pawls with their respective gear teeth. This design does not require any tool or other device for initially positioning the fixture being supported at a desired location nor is any tool required for any subsequent re-positioning of the fixture.

BRIEF DESCRIPTION OF THE DRAWINGS

FIGS. 6–10 are perspective, top, side, front and bottom views of the body portions of the swivel mount.

FIGS. 11–15 are perspective, top, side, front and bottom views of the first assembly portion of the swivel mount.

FIGS. 16–20 are perspective, top, side, front and bottom views of the second assembly portion of the swivel mount.

DETAILED DESCRIPTION OF THE PREFERRED EMBODIMENT

Figure 1:
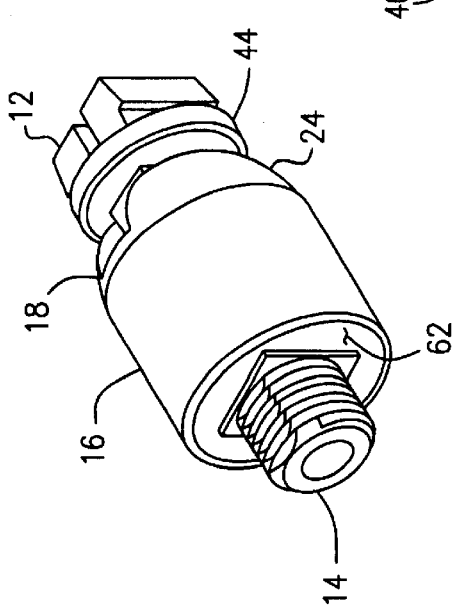
FIG. 1 is a perspective view of the swivel mount.

Referring initially to FIG. 1, there is shown swivel mount 10 in its assembled state. Swivel mount 10 is bracketed by opposite support structure 12 and 14 which may be of a variety of designs. Support structure 12 is shown of the 'snap-in' variety while support structure 14 is shown threaded. Other design variations of support structures 12 and 14 include bayonet, twist, keyed, push/turn or slide-on type supports as well. Mechanical fastening such as bolted or screwed supports as well as adhesive, fused, molded or other chemical or bonding-types of securement are equally possible. Support structures 12 and 14 can be of the same design or they can be of different designs, their purpose is to simply provide a manner of securing swivel mount 10 between a support (not shown) and the fixture being supported (not shown).

Figure 2:
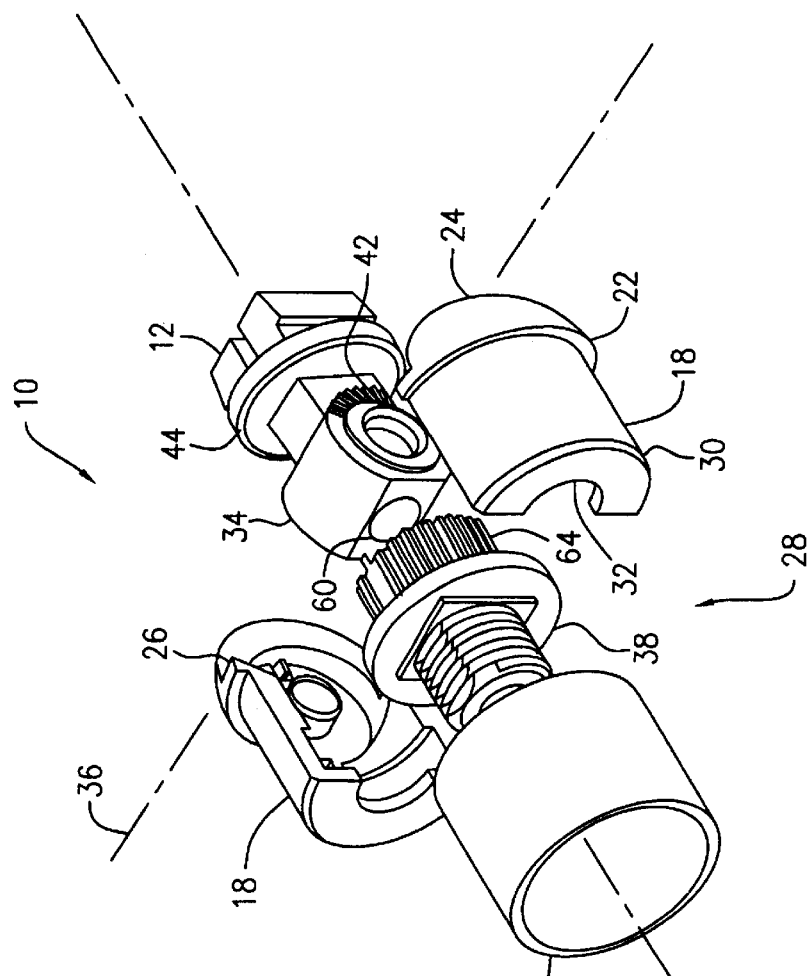
FIG. 2 is an exploded perspective view of the swivel mount.
Figure 3:
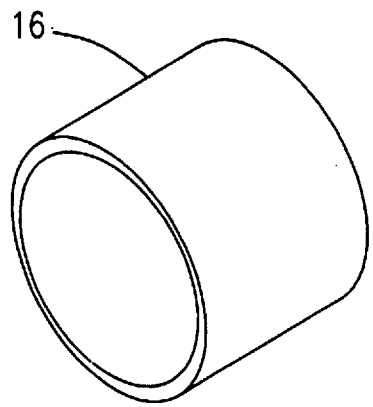
FIGS. 3–5 are perspective, top and side views of the sleeve portion of the swivel mount.
Figure 4:
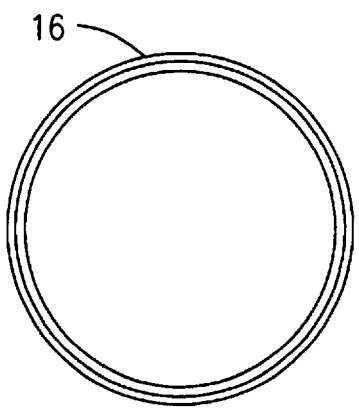
Figure 5:
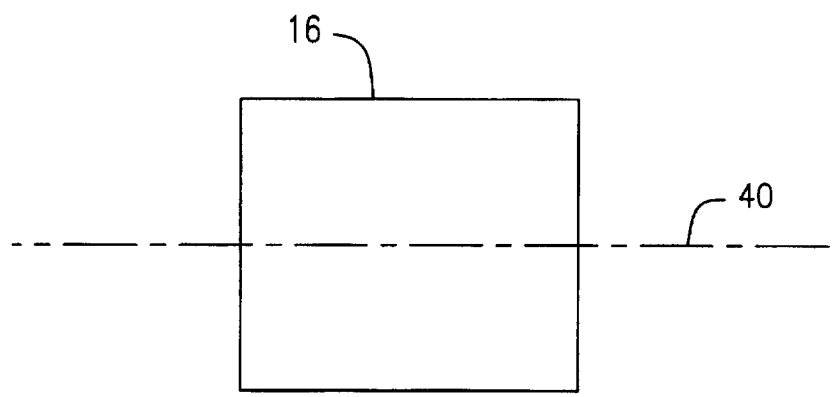

Swivel mount 10 is housed within sleeve 16 which, as shown in FIGS. 3–5, is cylindrical in shape but again, other shapes can be readily employed. Sleeve 16 slides over and around body portions 18 as indicated in FIG. 2 (although more or fewer such body portions can also be incorporated). In this embodiment and as shown in FIGS. 6–10, body portions 18 are identical to each other and may be substituted for each other for ease of manufacture and assembly of swivel mount 10 however, this need not necessarily be the case as it is also conceivable that body portions 18 would be configured differently from each other with opposing mating parts being snapped or latched together should such be desired. These body portions 18 are configured with a raised step or stop 22 against which sleeve 16 rests when in the assembled state. This step or stop 22 prevents sleeve 16 from sliding too far along body portions 18 and helps retain sleeve 16 in place. Thus, once assembled, sleeve 16 is retained between step or stop 22 and the fixture being supported (or alternatively with a different design of body portions 18, between step or stop 22 and the support). Sleeve 16 prevents the disassembly of swivel mount 10 by maintaining body portions 18 in place.

Alternatively, sleeve 16 could be configured to slide fully along body portions 18 and be retained between the support (or support structure 12) and the fixture being supported (or support structure 14). In this fashion, body portions 18 would not incorporate raised step or stop 22. Furthermore, rather than utilize sleeve 16, the same function that sleeve 16 serves (i.e. maintaining body portions 18 together and in place) can be accomplished by a clasp or other such structure secured to or around body portions 18. Thus, the use of stop 22 is optional. Furthermore, sleeve 16 could be pushed onto body portions 18 from either end (i.e. from the direction of either support structure 12 or support structure 14). Should stop 22 be employed, then sleeve 16 would abut stop 22 and, respectively, the fixture being supported or the support. The main purpose of sleeve 16 (or its equivalent) is to retain or clamp body portions 18 in position and prevent their becoming released from swivel mount 10. The need for this will become apparent upon further discussion of the mechanisms within body portions 18.

In the current embodiment, however, body portions 18 are configured with rounded, curved, or inset ends 24. By this configuration, the fixture being supported may be adjusted without any interference between body portions 18 and the support (or support structure 12). Furthermore, ends 24 incorporate a notch 26 so as to accommodate the internal mechanism 28 of swivel mount 10. Opposite ends 30 of body portions 18 (i.e. that which is adjacent support structure 14) are likewise notched 32 to accommodate internal mechanism 28. As shown, body portions 18 are retained in the assembled state via sleeve 16 in order to prevent their separation or release from swivel mount 10.

Referring now more specifically to FIG. 2, there is shown an exploded view of internal mechanism 28. As seen, internal mechanism 28 is constructed of a plurality of differently configured parts which may be separately molded, cast or cut. It is these parts which enable swivel mount 10 to retain the fixture being supported in a variety of different positions.

In the embodiment shown, internal mechanism 28 consists of a first assembly 34 for rotation about a first axis 36 and a second assembly 38 for rotation about a second axis 40. Generally, first and second axes 36 and 40 would be perpendicular to each other (as shown) but this is not necessarily the case in all situations since these axes can also be oriented at an angle to each other if desired for a particular circumstance or application. This is due to first and second assemblies 34 and 38 operating independent of each other (of course, for any such angled configuration, body portions 18 and possibly sleeve 16 would have to be equally re-configured and angled).

In this embodiment, first assembly 34 is constructed continuous with support structure 12 but this is more for economy of manufacture and is not required for operation. First assembly 34 consists of a series of gear teeth 42 that are aligned with respect to first axis 36 so as to permit movement about axis 36 in a controlled fashion. These gear teeth 42 may be on one side only or, as shown in FIGS. 11–15, on both sides of first assembly 34. Furthermore, gear teeth 42 are shown as extending only partially around axis 36 but if desired, gear teeth 42 can also extend fully around axis 36.

A stop flange 44 is also shown intermediate first assembly 34 and support structure 12 which serves the purpose of preventing 'snap-in' support structure 12 from being inserted too far within the support (not shown). The same stop function can also be accomplished by increasing the size of member 46 but in doing so, notch 26 of body portions 18 would also have to vary from that shown. Such a stop flange 44 may not be necessary if other types of support structure are used.

First assembly 34 is shown having a round or curved exterior which compliments end 24 of body portions 18 so that body portions 18 are free to swivel about axis 36. To maintain this hinge-type movement between first assembly 34 and body portions 18, first assembly is configured with a first mating surface 48 (having a slight entry taper 50) while body portions 18 are configured with a matching mating surface 52 (with a matching entry taper 54). When assembled, mating surfaces 48 and 52 are concentric about axis 36 thereby permitting body portions 18 to swivel about axis 36. The actual configuration and inter-engagement of mating surfaces 48 and 52 may vary from that shown (such as by configuring first assembly mating surface 48 to fit within body portion mating surface 52) but any configuration will suffice provided rotation of body portion 18 about axis 36 is accomplished. Of course, care will have to be taken so that there is no interference between the mating surfaces (48 and 52) and gear teeth 42. Such lack of interference between the two is shown in the present embodiment by raised flange 56 surrounding mating surface 48 of first assembly 34.

Gear teeth 42 is engaged by pawl 58 secured to the interior of body portion 18.

Pawl 58 may be integrally molded to body portion 18 or pawl may be of a different material (including metal) that is separately installed or affixed. One or more such pawl 58 can be employed to interface with gear teeth 42. Such inter-engagement of pawl 58 and gear teeth 42 provide the expected function of positioning, indexing and alignment. Pawl 58 is flexible so as to enable body portion 18 to rotate about axis 36 yet strong enough to support the fixture to be supported in the desired location. In the present embodiment, pawl 58 is molded into each body portion 18 and engage separate gear teeth 42. As indicated in FIG. 2, should body portions 18 be rotated to one extreme or the other, notches 26 in ends 24 would engage member 46 of first assembly 34 thereby preventing further rotation of body portions 18 about axis 36.

Wire passageway 60 extends along axis 40 through first assembly 34 and provides a channel for the passage of a wire or wires therethrough. Consequently, with this arrangement, there is no need for the wire or wires to be bent around any obstruction and furthermore the insertion of the wire or wires into and thru passageway 60 is straightforward and easy to accomplish.

Referring now to FIGS. 16–20, there is shown second assembly 38 within body portion 18. Second assembly 38 is shown as incorporating threaded support structure 14 but the two can be separately manufactured if desired. Flange 62 is shown intermediate threaded support structure 14 and second gear teeth 64. Second gear teeth 64 engage pawl 66 of body portion 18 in much the same manner that pawl 58 engages first gear teeth 42. Pawl 66 may also be of similar construction as pawl 58. Second gear teeth 64 rotate about axis 40 within recess 68 in body portion 18. Wire passageway 70 extends through second assembly 38 in alignment with axis 40. In this manner, the wire or wires passing through second assembly 38 do not need to be bent around any obstruction within swivel mount 10. Furthermore, and as shown in FIG. 2, wire passageways 60 and 70 align or intersect with each other (and at one position can be co-linear) thereby easing the passage of wire or wires through first and second assemblies 34 and 38. Hence, the combination of passageways 60 and 70 create a continuous opening or conduit for the passage of wire or wires through swivel mount 10. Should passageways 60 and 70 not be co-linear, then the only bending of the wire or wires would be where passageways 60 and 70 meet or intersect. Stop or stops 72 adjacent gear teeth 64 prevent second assembly 38 from rotating too far within swivel mount 10 thereby preventing the wire or wires passing therethrough from becoming twisted.

In operation, wire or wires passing out of the supporting structure are threaded through passageways 60 and 70 in swivel mount 10. If there is any difficulty in accomplishing this task, sleeve 16 can be removed so as to allow access to the interior of swivel mount 10 and more specifically to first and second assemblies 34 and 38 in order to complete the passage of wires through swivel mount 10. Afterwards, support structures 12 and 14 are secured to, respectively, the support and the fixture being supported in the normal fashion. The fixture can now be adjusted into the desired position by rotating swivel mount 10 about either axis 36 or 40. No tools or special devices are needed for such positioning since pawls 58 and 66 are stiff enough to retain the fixture in place by remaining engaged with the selected gear teeth. However, if a new position for fixture is desired, then it would be a matter of simply re-positioning swivel mount 10 since pawls 58 and 60 are flexible enough to allow their movement into different teeth of gear teeth 42 and 64.

As seen in FIG. 2, swivel mount is easily assembled by arranging body portions 18 around first and second assemblies 34 and 38 such that pawls 58 and 66 engage their respective gear teeth 42 and 64. Afterwards, sleeve 16 is slid around body portions 18 to retain them in place and to retain engagement of pawls 58 and 66 against their respective gear teeth 42 and 64. As stated earlier, alternate configurations for both sleeve 16 and body portions 18 are possible and include the possibility of eliminating sleeve 16 altogether by incorporating a clasp or latch on one body portion 18 and a mating catch on the other body portion (e.g. complimentary male and female components) so as to keep body portions 18 clamped or snapped together around first and second assemblies 34 and 38.

While the foregoing is a detailed description of the preferred embodiment, it will be appreciated that it is not the intent to limit the scope of the invention to the preferred embodiment. Instead, the scope of the invention is intended to be limited only by the scope of the claims which are appended hereto.

What is claimed is:

1. A swivel mount for supporting a fixture from a support comprising:
   (a) a first member having first gear teeth for rotation about a first axis;
   (b) a second member having second gear teeth for rotation about a second axis, said first and second axes being neither co-linear or parallel;
   (c) at least one body portion enclosing at least a portion of said first and second gear teeth, said body portion having first and second pawls for yieldable engagement with, respectively, said first and second gear teeth; and,
   (d) an outer member for maintaining engagement of said pawls with their respective said gear teeth.

2. The swivel mount of claim 1 wherein said first and second axis are coplanar.

3. The swivel mount of claim 2 wherein said first member has a first wire passageway therethrough in alignment with said first axis and said second member has a second wire passageway therethrough extending from said first wire passageway, said first and second passageways creating a wire channel through said swivel mount.

4. The swivel mount of claim 3 wherein said first and second members are configured with, respectively, first and second support structures for engaging a support at one end of said swivel mount and for engaging the fixture at an opposite end of said swivel mount.

5. The swivel mount of claim 3 wherein said outer member is a sleeve.

6. A swivel mount for supporting a fixture from a support comprising:
   (a) a first member having first gear teeth for rotation about a first axis;
   (b) a second member having second gear teeth for rotation about a second axis, said first and second axes being neither co-linear or parallel;
   (c) at least one body portion enclosing at least a portion of said first and second gear teeth, said body portion having at least first and second pawls for yieldable engagement with, respectively, said first and second gear teeth; and,
   (d) a third member configured to urge engagement of said pawls with their respective said gear teeth.

7. The swivel mount of claim 6 wherein said first and second axis are coplanar.

8. The swivel mount of claim 7 wherein said first member has a first wire passageway therethrough in alignment with said first axis and said second member has a second wire passageway therethrough extending from said first wire passageway, said first and second passageways creating a wire channel through said swivel mount.

9. The swivel mount of claim 8 wherein said first and second members are configured with, respectively, first and second support structures for engaging a support at one end of said swivel mount and for engaging the fixture at an opposite end of said swivel mount.

10. The swivel mount of claim 8 wherein said third member is a sleeve.

11. A boltless swivel mount for supporting a fixture from a support comprising:
   (a) a first member having first gear teeth for rotation about a first axis;
   (b) a second member having second gear teeth for rotation about a second axis, said first and second axes being neither co-linear or parallel;
   (c) at least one body portion enclosing at least a portion of said first and second gear teeth, said body portion having first and second pawls for yieldable engagement with, respectively, said first and second gear teeth; and, (d) a third member for maintaining engagement of said pawls with their respective said gear teeth.

12. The swivel mount of claim 11 wherein said first and second axis are coplanar.

13. The swivel mount of claim 12 wherein said first member has a first wire passageway therethrough in alignment with said first axis and said second member has a second wire passageway therethrough extending from said first wire passageway, said first and second passageways creating a wire channel through said swivel mount.

14. The swivel mount of claim 13 wherein said first and second members are configured with, respectively, first and second support structures for engaging a support at one end of said swivel.mount and for engaging the fixture at an opposite end of said swivel mount.

15. The swivel mount of claim 13 wherein said third member is a sleeve.

16. A swivel mount for supporting a fixture from a support comprising:
   (a) a first member having first mating structure arranged about a first axis;
   (b) a second member having second mating structure arranged about a second axis, said first and second axes being neither co-linear or parallel;
   (c) at least one body portion enclosing at least a portion of said first and second mating structure, said body portion having first and second complementary mating structure for yieldable engagement with, respectively, said first and second mating structure; and,
   (d) an outer member designed to maintain engagement between said complimentary mating structure and its respective said mating structure, said first member has a first wire passageway therethrough in alignment with the first axis and said second member has a second wire passageway therethrough extending from the first wire passageway, said firs and second passageways creating a wire channel through said swivel mount.

17. A swivel mount for supporting a fixture from a support comprising:
   (a) a first member having first gear teeth arranged about a first axis;
   (b) a second member having second gear teeth arranged about a second axis, said first and second axes being neither co-linear or parallel;
   (c) at least one body portion enclosing at least a portion of said first and second gear teeth, said body portion having complementary engagement members for yieldable engagement with, respectively, said first and second gear teeth; and,
   (d) a third member urging the inter-engagement of said engagement members with their respective said gear teeth.

18. The swivel mount of claim 17 wherein said first member has a first wire passageway therethrough in alignment with said first axis and said second member has a second wire passageway therethrough extending from said first wire passageway, said first and second passageways creating a wire channel through said swivel mount.

* * * * *